(12) United States Patent
Kishida

(10) Patent No.: US 11,511,424 B2
(45) Date of Patent: Nov. 29, 2022

(54) SURGICAL ROBOT AND METHOD OF MANIPULATING POSITIONER

(71) Applicants: KAWASAKI JUKOGYO KABUSHIKI KAISHA, Kobe (JP); MEDICAROID CORPORATION, Kobe (JP)

(72) Inventor: Yuji Kishida, Kobe (JP)

(73) Assignees: KAWASAKI JUKOGYO KABUSHIKI KAISHA, Kobe (JP); MEDICAROID CORPORATION, Kobe (JP)

( * ) Notice: Subject to any disclaimer, the term of this patent is extended or adjusted under 35 U.S.C. 154(b) by 87 days.

(21) Appl. No.: 17/103,738

(22) Filed: Nov. 24, 2020

(65) Prior Publication Data

US 2021/0154837 A1 May 27, 2021

(30) Foreign Application Priority Data

Nov. 25, 2019 (JP) .............................. JP2019-212332

(51) Int. Cl.
| | |
|---|---|
| G06F 3/048 | (2013.01) |
| B25J 9/16 | (2006.01) |
| G06F 3/04847 | (2022.01) |
| B25J 9/10 | (2006.01) |
| G06F 3/0488 | (2022.01) |
| B25J 13/08 | (2006.01) |
| G06F 3/0482 | (2013.01) |

(52) U.S. Cl.
CPC ............ B25J 9/1664 (2013.01); B25J 9/106 (2013.01); B25J 13/081 (2013.01); G06F 3/0482 (2013.01); G06F 3/0488 (2013.01); G06F 3/04847 (2013.01)

(58) Field of Classification Search
CPC ......... A61B 34/25; A61B 34/30; A61B 34/35; A61B 2034/25; B25J 9/106; B25J 9/1664; B25J 13/081; G06F 3/0482; G06F 3/04847; G06F 3/0488
See application file for complete search history.

(56) References Cited

U.S. PATENT DOCUMENTS

| | | | |
|---|---|---|---|
| 2017/0000575 A1* | 1/2017 | Griffiths | ................. A61B 50/10 |
| 2017/0172674 A1 | 6/2017 | Hanuschik et al. | |
| 2019/0231459 A1* | 8/2019 | Mustufa | ................. A61B 90/00 |

FOREIGN PATENT DOCUMENTS

JP       2017-515522 A       6/2017

* cited by examiner

Primary Examiner — Claudia Dragoescu
(74) Attorney, Agent, or Firm — Metrolex IP Law Group, PLLC

(57) ABSTRACT

A surgical robot includes: a plurality of manipulator arms; a platform to which the plurality of manipulator arms are coupled; a positioner configured to change the position and posture of the platform; a controller configured to control the positioner; and a user interface. The user interface includes: first manipulation tools each configured to receive an input of manipulation which selects one of a plurality of operating modes for changing the position and posture of the platform; and a single second manipulation tool configured to receive an input of manipulation information regarding the position and posture. The controller generates a command regarding the position and posture of the platform based on the acquired manipulation information and the selected operating mode and operates the positioner based on the generated command.

20 Claims, 8 Drawing Sheets

SURGICAL ROBOT AND METHOD OF MANIPULATING POSITIONER

CROSS-REFERENCE TO RELATED APPLICATION

This application claims priority to and the benefit of Japanese Patent Application No. 2019-212332, filed on Nov. 25, 2019, the entire disclosure of which is incorporated herein by reference.

BACKGROUND OF THE INVENTION

1. Field of the Invention

The present invention relates to a surgical robot, and more particularly to a user interface which receives an input of manipulation regarding a positioner supporting a manipulator.

2. Description of the Related Art

A robot surgery system which performs minimally invasive surgery has been known. Published Japanese Translation of PCT Application No. 2017-515522 (hereinafter referred to as "Patent Literature 1 (PTL 1)") discloses this type of robot surgery system.

The robot surgery system of PTL 1 includes a surgeon console and a surgical robot (remote manipulation assembly) remotely manipulated by the surgeon console. The surgical robot includes: a base; an extensible column supported by the base; an extensible boom which extends horizontally from the column; a platform supported by a tip end of the boom; a plurality of manipulator arms attached to the platform; and surgical instruments attached to tip ends of the manipulator arms.

In the surgical robot of PTL 1, the plurality of manipulator arms are attached to the single platform. When the position and posture of the platform change, the positions and postures of proximal end portions of the plurality of manipulator arms change. A touchpad as a user interface is provided at the column of the surgical robot. Commands related to the operations of the column, the boom, and the manipulator arms may be input to the touchpad.

A manipulation input method of the touchpad as in PTL 1 is disclosed in Non Patent Literature 1 (Intuitive Surgical, Inc., "Drive and Position—P5_OR_PC_Helm Interactions—Xi Video Training—US", "Demonstrates how to drive the Patient Cart and work with OR Staff patient side to position the Patient Cart for docking.", [online], 2016, [searched on Jun. 6, 2019], Internet <URL: "https://us.davincisurgerycommunity.com/detail/videos/p5_or_pc_helm-interactions/video/5211406414001/drive-and-position?autoStart=true&=&index=0">), Non Patent Literature 2 (Intuitive Surgical, Inc., "Drive and Position—P5_OR_PC_Helm Interactions—Xi Video Training—US", "Demonstrates how to Sterile Stow the Patient Cart Arms.", [online], 2016, [searched on Jun. 6, 2019], Internet <URL: "https://us.davincisurgerycommunity.com/detail/videos/p5_or_pc_helm-interactions/video/5211440511001/sterile-stow-button?autoStart=true&=&index=1">), Non Patent Literature 3 (Intuitive Surgical, Inc., "Drive and Position—P5_OR_PC_Helm Interactions—Xi Video Training—US", "Demonstrates how to adjust the Patient Cart boom via the Patient Cart touchpad and the boom position and boom height joysticks.", [online], 2016, [searched on Jun. 6, 2019], Internet <URL: "https://us.davincisurgerycommuni-ty.com/detail/videos/p5_or_pc_helm-interactions/video/5210213315001/adjust-boom-via-touchpad?autoStart=true&=&index=0">), and Non Patent Literature 4 (Intuitive Surgical, Inc., "Drive and Position—P5_OR_PC_Helm Interactions—Xi Video Training—US", "Demonstrates how to stow and shut down the da Vinci Xi System.", [online], 2016, [searched on Jun. 6, 2019], Internet <URL: "https://us.davincisurgerycommunity.com/detail/videos/p5_or_pc_helm-interactions/video/5211443798001/stow-hutdown?autoStart=true&=&index=3">). The touchpad includes a touch panel-type display, a power supply button, an emergency button, a joystick, and a lifting/lowering lever. The display displays a Deploy button, a Stow button, and an Enable Joystick button. While a user is pressing the Deploy button, the platform advances toward a surgical table on which a patient lies, and the plurality of manipulator arms are changed from a folded state to a deployed state. While the user is pressing the Stow button, the platform retreats from the surgical table, and the plurality of manipulator arms are changed from the deployed state to the folded state. When the user rotates or tilts the joystick with one hand while pressing the Enable Joystick button with the other hand, the platform turns or moves in a horizontal direction. When the user tilts the lever with one hand while pressing the Enable Joystick button with the other hand, the column extends or contracts to lift or lower the platform. The display displays a model of the patient and a surgery site. The user manipulates the joystick and/or the lever to move the manipulator arms to a docking position while being guided by an assistant who is close to the surgical table and the plurality of manipulator arms.

SUMMARY OF THE INVENTION

Each of the touchpads described in Non Patent Literatures 1 to 4 includes a manipulation tool which receives an input of manipulation regarding height movement of the platform and a manipulation tool which receives an input of manipulation regarding horizontal movement of the platform. Therefore, the manipulation may become complex.

The present invention was made under these circumstances, and an object of the present invention is to provide a user interface which is mounted on a surgical robot and facilitates manipulation of a user.

A surgical robot according to one aspect of the present invention includes: a plurality of manipulator arms including respective distal end portions to which surgical instruments are attached; a platform to which proximal end portions of the plurality of manipulator arms are coupled; a positioner including a plurality of links and joint driving devices, the plurality of links being provided in series through joints, the joint driving devices being provided at the respective joints, the positioner supporting the platform and being configured to change a position and posture of the platform; a controller configured to operate the positioner such that the position and posture of the platform correspond to a commanded position and posture; and a user interface configured to receive an input of manipulation regarding the positioner. The user interface includes first manipulation tools each configured to receive an input of manipulation which selects one of a plurality of operating modes for changing the position and posture of the platform and a single second manipulation tool configured to receive an input of manipulation information regarding the position and posture. The controller generates a command regarding the position and posture of the platform based on the manipulation information received by the second manipulation tool and the selected operating mode and operates the positioner based on the generated command.

Moreover, a method of manipulating a positioner according to one aspect of the present invention is a method of manipulating a positioner in a surgical robot, the surgical robot including: a plurality of manipulator arms including respective distal end portions to which surgical instruments are attached; a platform to which proximal end portions of the plurality of manipulator arms are coupled; a positioner including a plurality of links and joint driving devices, the plurality of links being provided in series through joints, the joint driving devices being provided at the respective joints, the positioner supporting the platform and being configured to change a position and posture of the platform; and a controller configured to operate the positioner such that the position and posture of the platform correspond to a commanded position and posture, the method including: acquiring a selected one of a plurality of operating modes which are input from first manipulation tools to change the position and posture of the platform; acquiring manipulation information regarding the position and posture of the platform, the manipulation information being input from a second manipulation tool; generating a command regarding the position and posture of the platform based on the acquired manipulation information and the selected operating mode; and operating the positioner based on the generated command.

According to the surgical robot and the method of manipulating the positioner, the manipulation information regarding the position and posture is input by the single second manipulation tool regardless of the operating mode. To be specific, a manipulation tool for the height movement of the platform and a manipulation tool for the horizontal movement of the platform are not being used. Therefore, the number of manipulation tools provided at the user interface can be reduced. Moreover, wrong manipulation, such as confusion of the manipulation tools, can be prevented, and the manipulation can be simplified. As above, according to the present invention, the manipulation of the user can be made easier as a whole than when the conventional user interface is used.

The present invention can provide the user interface which is mounted on the surgical robot and is easily manipulated by the user.

The above object, other objects, features, and advantages of the present invention will be made clear by the following detailed explanation of the preferred embodiment with reference to the attached drawings.

DESCRIPTION OF THE PREFERRED EMBODIMENTS

Figure 1:
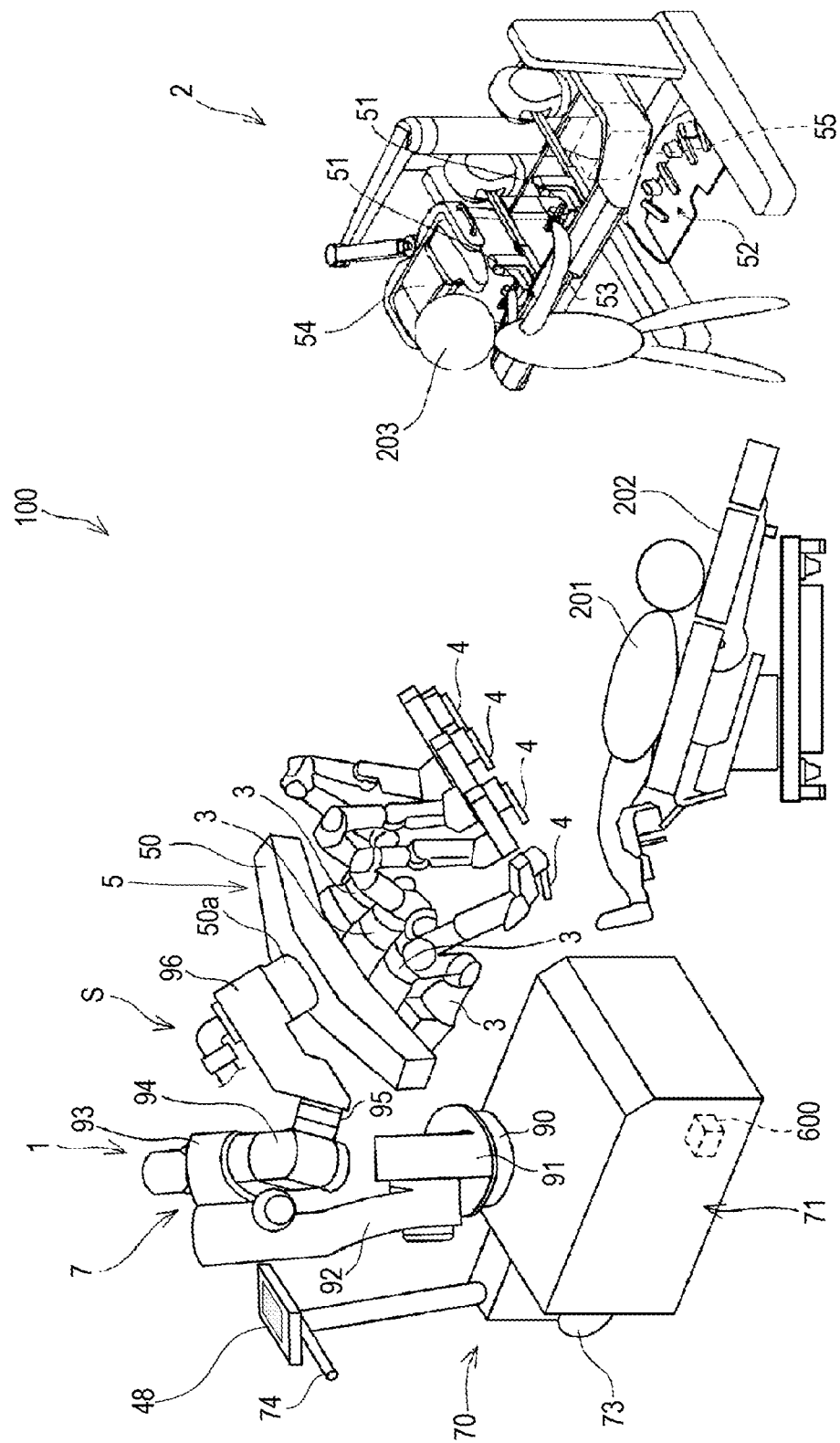
FIG. 1 is a diagram showing an entire configuration of a surgery system including a surgical robot according to one embodiment of the present invention.

Hereinafter, one embodiment of the present invention will be described with reference to the drawings. FIG. 1 is a diagram showing an entire configuration of a surgery system 100 including a surgical robot 1 according to one embodiment of the present invention. The surgery system 100 shown in FIG. 1 is utilized in an endoscopic surgery in which the surgical robot 1 remotely manipulated by a surgeon 203 performs surgery of a patient 201.

The surgery system 100 includes the surgical robot 1 as a patient-side system and a console 2 as a surgeon-side system. The console 2 is arranged away from the surgical robot 1, and the surgical robot 1 is remotely manipulated by the console 2 during the surgery. The surgeon 203 inputs to the console 2 an operation command regarding an operation to be performed by the surgical robot 1, and the console 2 transmits the input operation command to the surgical robot 1. The surgical robot 1 acquires the operation command and operates a long shaft-shaped surgical instrument 4 and the like, included in the surgical robot 1, based on the operation command. The surgical instrument 4 may be a surgical tool, such as an endoscope assembly or a forceps.

Console 2

The console 2 is an apparatus which constitutes an interface between the surgery system 100 and the surgeon 203 and is used to manipulate the surgical robot 1. The console 2 is provided inside or outside a surgery room. The console 2 includes a manipulation input portion, a monitor 54, and a control portion 55. The surgeon 203 inputs the operation command to the manipulation input portion. Examples of the manipulation input portion include a surgeon-side manipulator arm 51 and a manipulating pedal 52. The monitor 54 displays an image taken by the endoscope assembly that is one of the surgical instruments 4. While visually confirming an affected part (surgery site) on the monitor 54, the surgeon 203 inputs the manipulation to the manipulation input portion. The control portion 55 acquires the input of the manipulation received by the manipulation input portion, generates the operation command, and transmits the operation command to a below-described robot controller 600 of the surgical robot 1 through wired or wireless communication.

Surgical Robot 1

The surgical robot 1 constitutes an interface between the surgery system 100 and the patient 201. In the surgery room, the surgical robot 1 is arranged close to a surgical table 202 on which the patient 201 lies. An inside of the surgery room is a sterile field.

Figure 2:
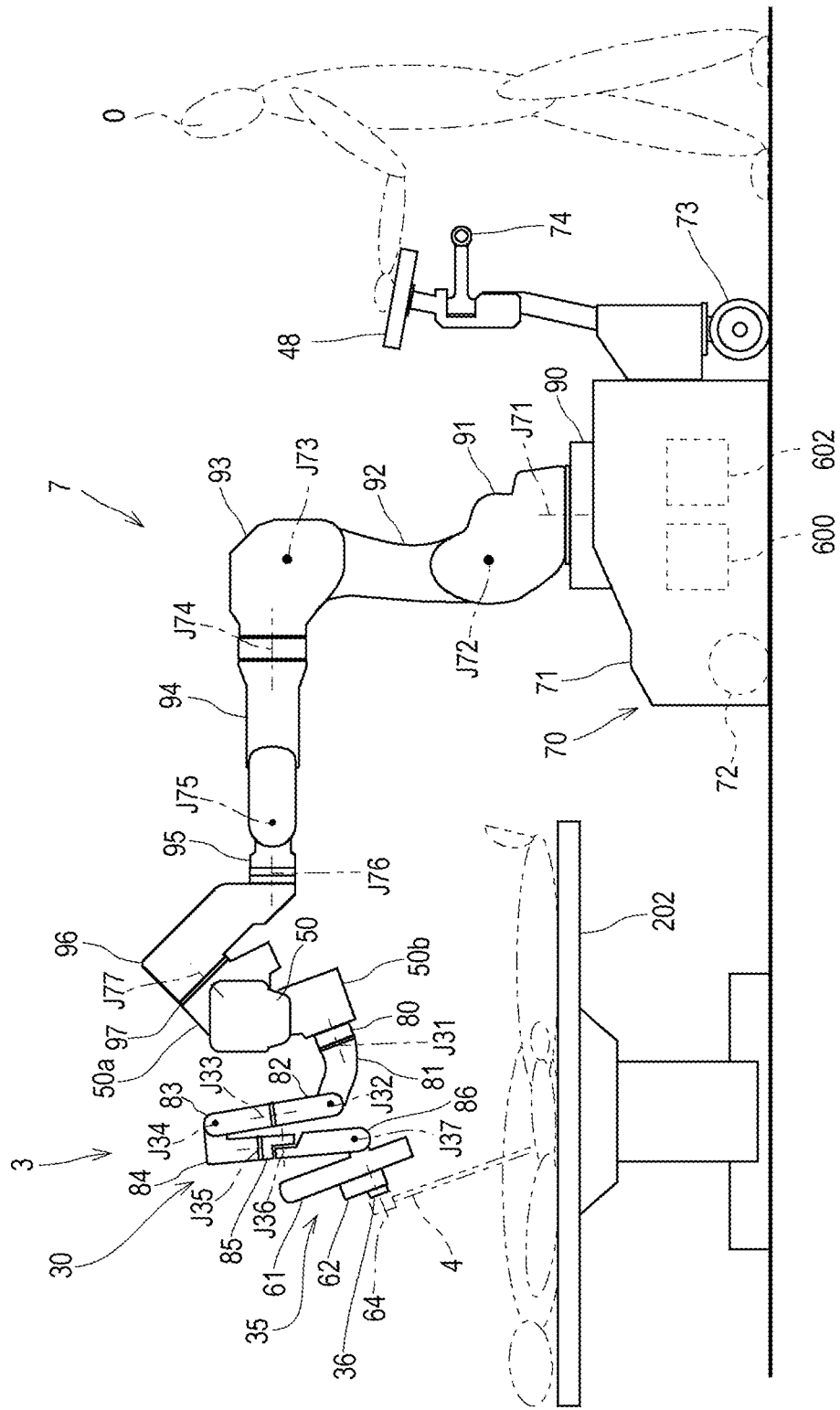
FIG. 2 is a side view of the surgical robot.

FIG. 2 is a side view of the surgical robot 1. The surgical robot 1 shown in FIGS. 1 and 2 include: a cart 70; a positioner 7 supported by the cart 70; a platform 5 attached to a distal end portion of the positioner 7; a plurality of patient-side manipulator arms (hereinafter simply referred to as "arms 3") detachably attached to the platform 5; the surgical instruments 4 attached to distal end portions of the arms 3; and the robot controller 600. The positioner 7 and the platform 5 are covered with a sterile drape (not shown) during the surgery. In the surgical robot 1, components from the cart 70 to the surgical instrument 4 are coupled to each other in series. In the present specification, regarding each of these components, an end portion located close to the cart 70 is referred to as a "proximal end portion," and an opposite end portion is referred to as a "distal end portion."

Cart 70

The cart 70 includes a cart main body 71, a front wheel 72, a rear wheel 73, and a handle 74. A user 0 (the surgeon 203 or a surgery assistant) holds the handle 74 and steers the cart 70. A manipulation input device 48 as a user interface is provided above the handle 74. In the present embodiment, the manipulation input device 48 is provided at the cart 70 such that the user 0 in the surgery room can visually confirm and manipulate the manipulation input device 48. However, the manipulation input device 48 may be provided at a different place of the surgical robot 1. The manipulation input device 48 may be configured to display information data regarding a state of the surgical robot 1, information regarding a specific surgery, and information regarding the entire surgery system 100. The manipulation input device 48 may be configured as an input device which receives the input of the manipulation regarding the surgical robot 1. The manipulation input device 48 will be described later in detail.

Positioner 7

The positioner 7 according to the present embodiment is configured as a seven-axis vertical articulated robot arm. The positioner 7 three-dimensionally moves the position of the platform 5 relative to the cart 70. However, the configuration of the positioner 7 is not limited to the present embodiment. Examples of the positioner 7 include a multi-axis (other than seven-axis) vertical articulated robot arm and a multi-axis horizontal articulated robot arm.

The positioner 7 includes: a base 90 fixed to the cart 70; and a plurality of positioner links 91 to 96 serially connected to each other from the base 90. The plurality of positioner links 91 to 96 are: a first link 91 coupled to the base 90 through a first joint J71 so as to be turnable; a second link 92 coupled to the first link 91 through a second joint J72 so as to be swingable; a third link 93 coupled to the second link 92 through a third joint J73 so as to be swingable; a fourth link 94 coupled to the third link 93 through a fourth joint J74 so as to be turnable; a fifth link 95 coupled to the fourth link 94 through a fifth joint J75 so as to be swingable; and a sixth link 96 coupled to the fifth link 95 through a sixth joint J76 so as to be turnable. A mechanical interface 97 is coupled to the sixth link 96 through a seventh joint J77 so as to be turnable. The platform 5 is coupled to the mechanical interface 97.

Figure 3:
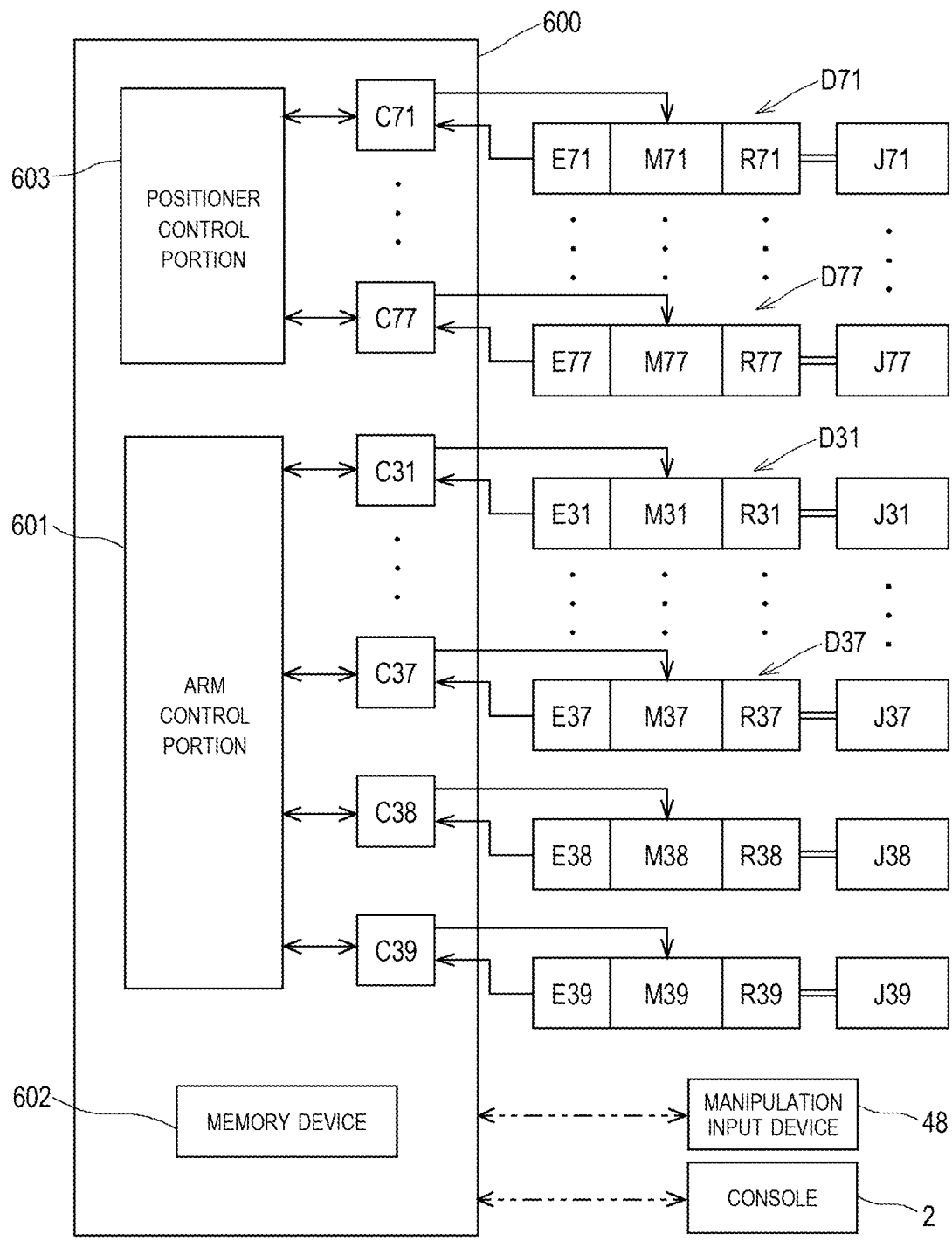
FIG. 3 is a diagram showing the configuration of a control system of the surgical robot.

Joint driving devices D71 to D77 which operate the respective joints J71 to J77 of the positioner 7 are provided at the respective joints J71 to J77. As shown in FIG. 3, each of the joint driving devices D71 to D77 includes: a servomotor (M71 to M77); an encoder (E71 to E77) which detects a rotation angle of the servomotor (M71 to M77); a reducer (R71 to R77) which amplifies output torque of the servomotor (M71 to M77); and a power transmission mechanism (not shown) which transmits the output of the servomotor (M71 to M77) to the positioner link. The power transmission mechanism may be constituted by a plurality of gears, a power transmission belt, or a combination of those.

Platform 5

As shown in FIGS. 1 and 2, the platform 5 serves as a hub for the plurality of arms 3. Since the plurality of arms 3 are attached to the platform 5, the platform 5 is also called an arm base. In the present embodiment, the combination of the cart 70, the positioner 7, and the platform 5 constitutes a manipulator arm support body S supporting the plurality of arms 3 such that the arms 3 are movable.

The platform 5 includes: a main body 50; a positioner coupling portion 50a provided at a proximal end portion of the main body 50; and a plurality of arm coupling portions 50b provided at a distal end portion of the main body 50. The positioner coupling portion 50a is coupled to the mechanical interface 97 of the positioner 7. The main body 50 has a longitudinal direction and is formed in an arch shape whose extending direction corresponds to the longitudinal direction. The plurality of arm coupling portions 50b are arranged at the main body 50 so as to be distributed in the longitudinal direction of the main body 50. In the present embodiment, four arm coupling portions 50b are provided. The proximal end portions of the arms 3 are detachably coupled to the respective arm coupling portions 50b.

Patient-Side Manipulator Arm 3

The plurality of arms 3 are practically the same in structure as each other. As shown in FIG. 2, each of the arms 3 includes an arm main body 30 and a translational unit 35 coupled to a distal end portion of the arm main body 30. Each arm 3 is configured such that the distal end portion can three-dimensionally move relative to the proximal end portion. A holder 36 to which the surgical instrument 4 is attached is provided at the distal end portion of each arm 3. In the present embodiment, the holder 36 is provided at the translational unit 35. The endoscope assembly is coupled to one of the plurality of arms 3. Moreover, the surgical tool is coupled to at least one of the plurality of arms 3. The surgical tool is selected from the group consisting of tools (for example, a pair of forceps, a pair of scissors, a grasper, a needle holder, a microdissector, a staple applier, a tucker, a suction cleaning tool, a snare wire, and a clip applier) each having a joint and tools (for example, a cutting blade, a cautery probe, a washer, a catheter, and a suction orifice) each not having a joint.

The arm main body 30 includes: a base 80 detachably attached to the platform 5; and a plurality of arm links 81 to 86 coupled to each other in series from the base 80 toward the distal end portion. The plurality of arm links 81 to 86 are: a first link 81 coupled to the base 80 through a first joint J31 so as to be turnable; a second link 82 coupled to the first link 81 through a second joint J32 so as to be swingable; a third link 83 coupled to the second link 82 through a third joint J33 so as to be turnable; a fourth link 84 coupled to the third link 83 through a fourth joint J34 so as to be swingable; a fifth link 85 coupled to the fourth link 84 through a fifth joint J35 so as to be turnable; and a sixth link 86 coupled to the fifth link 85 through a sixth joint J36 so as to be swingable. The translational unit 35 is coupled to the sixth link 86 through a seventh joint J37 so as to be swingable.

Joint driving devices D31 to D37 which operate the respective joints J31 to J37 of the arm main body 30 are provided at the respective joints J31 to J37. As shown in FIG. 3, each of the joint driving devices D31 to D37 includes: a servomotor (M31 to M37); an encoder (E31 to E37) which detects the rotation angle of the servomotor (M31 to M37); a reducer (R31 to R37) which amplifies the output torque of the servomotor (M31 to M37); and a power transmission mechanism (not shown) which transmits the output of the servomotor (M31 to M37) to the positioner link. The power transmission mechanism may be constituted by a plurality of gears, a power transmission wire, or a combination of those.

Referring back to FIG. 2, the translational unit 35 includes: a first translational link 61 coupled to the sixth link 86; a second translational link 62 which performs a translational movement relative to the first translational link 61; and the holder 36 provided at the second translational link 62. The second translational link 62 slides on the first translational link 61 in a longitudinal direction of the first translational link 61. With this, the surgical instrument 4 coupled to the holder 36 can be made to move in parallel with the longitudinal direction of the first translational link 61.

Moreover, the translational unit 35 is provided with: a servomotor M38 for the translational movement; a servomotor M39 for a rotational movement of the holder 36 about a rotation axis 64; encoders E38 and E39 which detect the rotation angles of the servomotors M38 and M39; and reducers R38 and R39 which decelerate the outputs of the servomotors M38 and M39 to increase the torque (see FIG. 3).

Robot Controller 600

The operation of the surgical robot 1 is controlled by the robot controller 600. The robot controller 600 is constituted by a computer, a servo controller, and the like. In the present embodiment, the robot controller 600 is provided inside the cart 70.

As shown in FIG. 3, the robot controller 600 includes: an arm control portion 601 which controls the operations of the plurality of arms 3; and a positioner control portion 603 which controls the operation of the positioner 7. Servo controllers C31 to C39 are electrically connected to the arm control portion 601, and the servomotors M31 to M39 are electrically connected to the respective servo controllers C31 to C39 through an amplifying circuit (not shown) and the like. Similarly, servo controllers C71 to C77 are electrically connected to the positioner control portion 603, and the servomotors M71 to M77 are electrically connected to the respective servo controllers C71 to C77 through an amplifying circuit (not shown) and the like.

The robot controller 600 includes a memory device 602. The memory device 602 stores information necessary for the robot-assisted surgery and preparation for the robot-assisted surgery. Examples of such information necessary for the robot-assisted surgery and the preparation for the robot-assisted surgery include information regarding the surgical instrument 4, information regarding the surgical robot 1, information regarding the surgical table 202, information regarding the console 2, and information regarding the content of the surgery. The information stored in the memory device 602 may contain a predetermined preparation position (i.e., the positions and postures of the platform 5 and the plurality of arms 3 at the time of presetting). A plurality of preparation positions may be set in accordance with the content (type) of the surgery, the surgery site, and the like. Moreover, the information stored in the memory device 602 may contain a predetermined storage position (i.e., the positions and postures of the platform 5 and the plurality of arms 3 at the time of storage). When the platform 5 and the plurality of arms 3 are located at the predetermined storage position, the positioner 7 and the plurality of arms 3 become the folded state such that when the cart 70 moves, the plurality of arms 3 and the like are prevented from contacting the wall of the surgery room, other surgical apparatuses, and the like. It should be noted that each of the preparation position and the storage position may be a position on robot coordinates (for example, a position based on the cart 70).

According to the above configuration, the arm control portion 601 acquires the input of the manipulation received by the console 2 or the manipulation input device 48. The arm control portion 601 generates a position command value based on the input manipulation and the rotation angles detected by the encoders E31 to E39. Each of the servo controllers C31 to C39 which have acquired the position command value generates a drive command value (torque command value) based on the rotation angle detected by the corresponding encoder (E31 to E39) and the position command value. The amplifying circuit which has acquired the drive command value supplies a driving current corresponding to the drive command value to the corresponding servomotor (M31 to M39). Thus, the joints J31 to J39 of each arm 3 operate, and a reference point (for example, the distal end portion of the arm 3) of the arm 3 performs movement corresponding to the input manipulation.

The positioner control portion 603 acquires the input of the manipulation received by the console 2 or the manipulation input device 48. The positioner control portion 603 generates the position command value based on the input manipulation and the rotation angles detected by the encoders E71 to E77. Each of the servo controllers C71 to C77 which have acquired the position command value generates the drive command value (torque command value) based on the rotation angle detected by the corresponding encoder (E71 to E77) and the position command value. The amplifying circuit which has acquired the drive command value supplies the driving current corresponding to the drive command value to the corresponding servomotor (M71 to M77). Thus, the joints J71 to J77 of the positioner 7 operate, and a reference point (for example, the mechanical interface 97 or the platform 5 coupled to the mechanical interface 97) of the positioner 7 performs movement corresponding to the input manipulation.

Regarding further detailed explanations of the surgical robot 1, the entire disclosures of Japanese Patent Application Nos. 2018-243422, 2018-243425, 2018-243445, 2018-243446, and 2018-243454 are incorporated herein by reference.

Method of Presetting Surgical Robot 1

The presetting of the surgical robot 1 is performed before starting the surgery performed by using the surgical robot 1. In the presetting, the holder 36 to which the surgical instrument 4 is attached is moved to a docking position suitable for the surgical instrument 4 inserted into a sleeve placed on a body surface of the patient 201.

First, when the user 0 drives the cart 70, the surgical robot 1 is moved close to the surgical table 202. At this time, the platform 5 and the plurality of arms 3 are located at the storage position.

After the cart 70 stops, the user 0 performs a selection input of the preparation position corresponding to the content of the surgery of the patient 201 by using the manipulation input device 48. In response to this, the robot controller 600 reads the corresponding information regarding the preparation position from the memory device 602 and operates the positioner 7 and the arms 3, and with this, moves the platform 5 and the plurality of arms 3 to the preparation position.

Next, the user 0 individually moves the platform 5 and the plurality of arms 3 from the preparation position by using the manipulation input device 48. Moreover, the user 0 may directly apply external force to the arms 3 to individually move the platform 5 and the plurality of arms 3 from the preparation position. As above, the holder 36 of each arm 3 is moved to the docking position by individually adjusting the positions of the platform 5 and the plurality of arms 3. Then, the surgical instrument 4 is coupled by the user 0 to the holder 36 located at the docking position.

During the presetting of the surgical robot 1, the robot controller 600 is set so as not to receive the manipulation of the console 2. After the presetting of the surgical robot 1 is terminated, the robot controller 600 can receive the manipulation of the console 2. In principle, during the surgery, with the positioner 7 in a stop state, the surgical robot 1 operates each arm 3 in accordance with the operation command from the console 2 to suitably change the position and posture of the surgical instrument 4.

Manipulation Input Device 48

Figure 4:
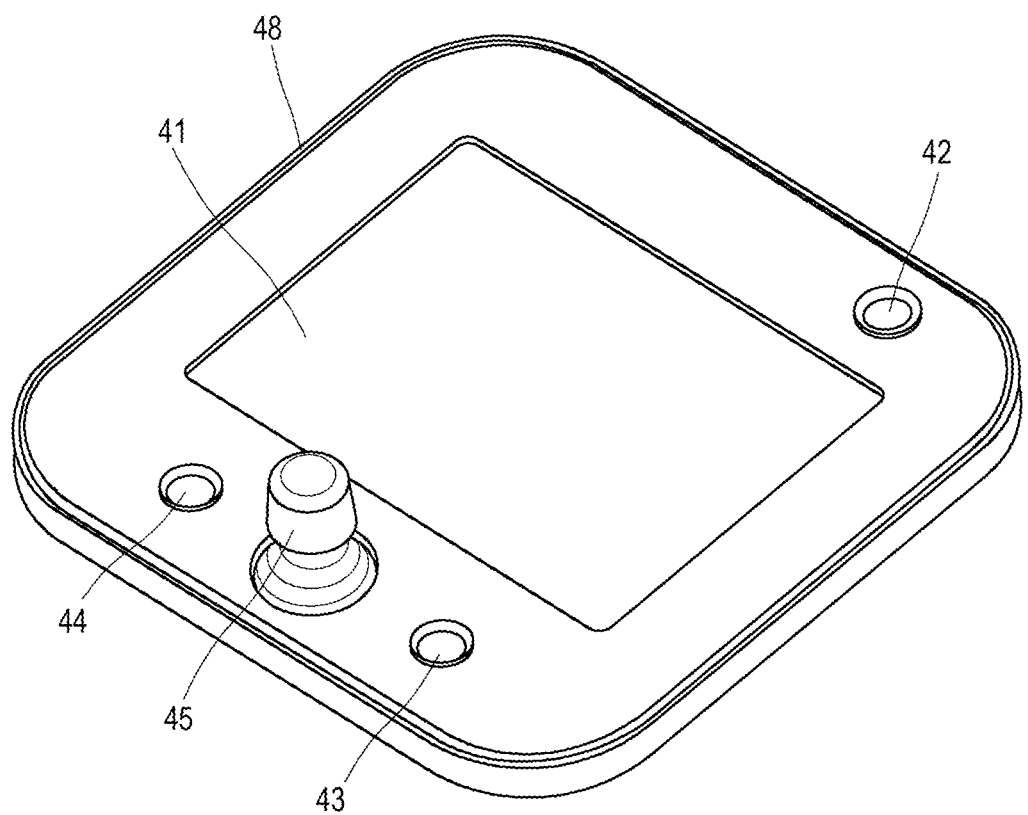
FIG. 4 is a perspective view of a manipulation input device.
Figure 5:
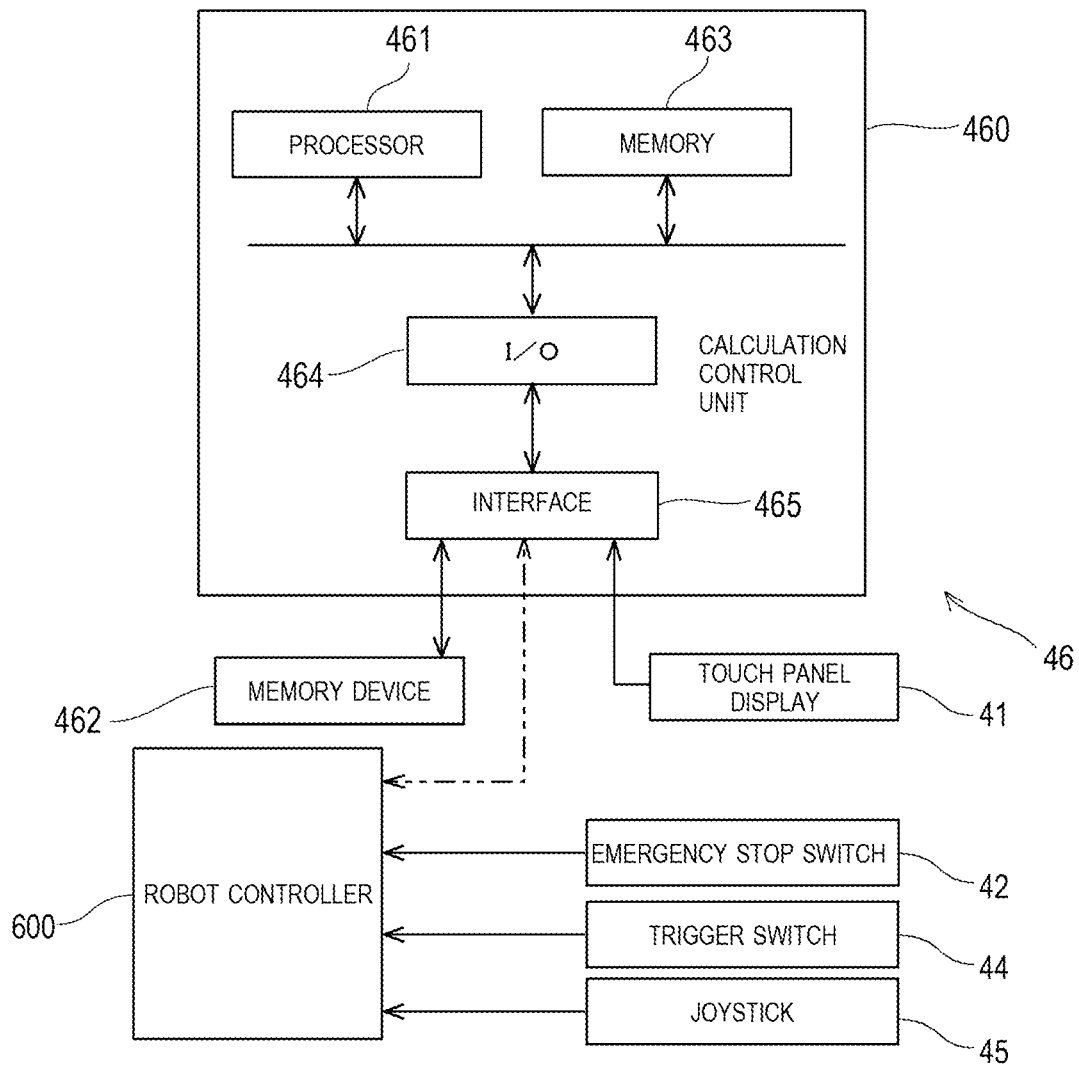
FIG. 5 is a diagram showing the configuration of a control system of the manipulation input device.

The manipulation input device 48 (corresponding to a user interface in the claims) will be described in detail. FIG. 4 is a perspective view of the manipulation input device 48, and FIG. 5 is a diagram showing the configuration of a control system of the manipulation input device 48. As shown in FIGS. 4 and 5, the manipulation input device 48 includes a touch panel display 41, an emergency stop switch 42, a power supply switch 43, a trigger switch 44 (corresponding to a third manipulation tool in the claims), a single joystick 45 (corresponding to a second manipulation tool in the claims), and a control portion 46.

The control portion 46 includes a calculation control unit 460 and a memory device 462. The calculation control unit 460 includes a processor 461, a memory 463 (such as a ROM and a RAM), and an I/O section 464. The memory device 462 is connected to the calculation control unit 460 through an interface 465. The display 41 is connected to the calculation control unit 460 through the interface 465. The calculation control unit 460, the emergency stop switch 42, the trigger switch 44 are communicable with the robot controller 600 through wireless or wired communication.

The calculation control unit 460 may include the single processor 461 which performs centralized control or a plurality of processors 461 which perform distributed control. For example, the calculation control unit 460 may be constituted by at least one of or a combination of two or more of a computer, a personal computer, a microcontroller, a microprocessor, a programmable logic device (PLD; such as a field-programmable gate array (FPGA)), a programmable logic controller (PLC), and a logic circuit. The memory 463 and the memory device 462 store basic programs, software programs, and the like executed by the processor 461. When the processor 461 reads and executes the software program, the calculation control unit 460 realizes a function corresponding to the software program.

The display 41 according to the present embodiment is a touch panel display and includes a panel-shaped display unit and a contact-type input unit. The display 41 displays an image output from the control portion 46. When the user 0 contacts (presses) a mark, such as a button, displayed on the display 41, the display 41 receives the input of the manipulation corresponding to the mark. The input of the manipulation received by the display 41 is transmitted to the control portion 46.

A normally closed contact point is adopted as a contact point of the emergency stop switch 42. When the emergency stop switch 42 is not being pressed, the contact point is in a closed state, and a current indicating a safe state flows. When the emergency stop switch 42 is continuously pressed for a predetermined period of time (for example, several seconds), the contact point opens, and the current is blocked. When the emergency stop switch 42 is pressed while the surgical robot 1 is being used, an emergency stop command is transmitted to the robot controller 600. The robot controller 600 acquires the emergency stop command and stops the operation of the surgical robot 1.

The power supply switch 43 is turned on or off by being continuously pressed for a predetermined period of time (for example, several seconds). When the power supply switch 43 is turned on, the manipulation input device 48 is supplied with electric power to start up. Moreover, when the power supply switch 43 is turned off, the supply of the electric power to the manipulation input device 48 stops, and this stops the manipulation input device 48.

The trigger switch 44 is a so-called dead man switch. The trigger switch 44 is turned on only while the user 0 is pressing the trigger switch 44. The trigger switch 44 is turned off when the pressing force is eliminated. The manipulation of the joystick 45 is effective only while the trigger switch 44 is in an on state. The manipulation of the joystick 45 is ineffective while the trigger switch 44 is in an off state. The robot controller 600 detects whether the trigger switch 44 is in the on state or the off state. It should be noted that the trigger switch 44 may be a three-position enable switch.

The joystick 45 is a manipulation tool which receives the input of manipulation information regarding a manipulation amount and a movement direction. In the present embodiment, the joystick 45 has a knob shape or lever shape which can tilt forward, rearward, leftward, and rightward and rotate forward and backward. A tilt direction of the joystick 45 corresponds to the input movement direction. A rotation direction of the joystick 45 corresponds to the input rotation direction. A tilt time and rotation time of the joystick 45 from a zero position (reference position) correspond to the manipulation amount. The input of the manipulation received by the joystick 45 is transmitted to the robot controller 600. The robot controller 600 receives the input from the joystick 45 only while the trigger switch 44 is in the on state.

As described above, various input units provided at the manipulation input device 48 acquire the input of the received manipulation and transmits information corresponding to the input manipulation to the robot controller 600. The information corresponding to the input manipulation may be a command generated based on the input manipulation or may be a signal corresponding to the input manipulation. The robot controller 600 operates the surgical robot 1 based on the information acquired from the manipulation input device 48.

Method of Manipulating Positioner 7

A method of manipulating the positioner 7 by using the manipulation input device 48 configured as above will be described. The following will describe a case where in the above-described presetting, the position and posture of the platform 5 are adjusted by manipulating the positioner 7 by using the manipulation input device 48. It should be noted that the manipulation of the positioner 7 by using the manipulation input device 48 can be performed at a time other than the presetting.

Figure 6:
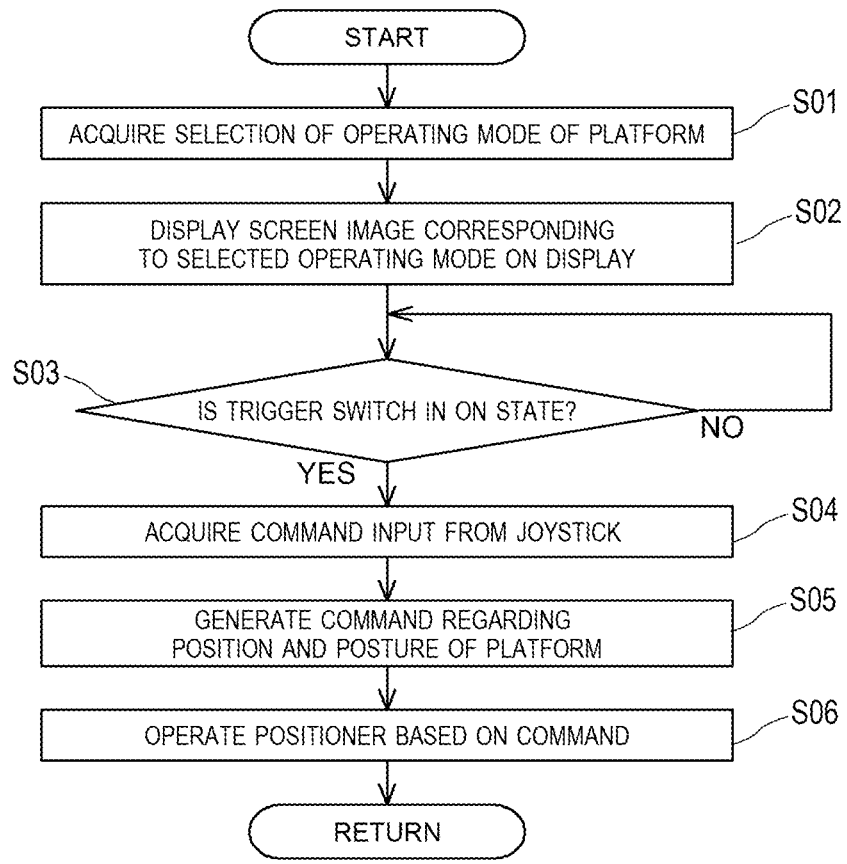
FIG. 6 is a flow chart showing a method of manipulating a positioner by using the manipulation input device.

FIG. 6 is a flow chart showing a process performed by the manipulation input device 48 which realizes a method of manipulating the positioner 7 according to the present embodiment. When moving the platform 5 by manipulating the positioner 7, the control portion 46 displays manipulation selection buttons 409 (see FIG. 7) on the display 41. In the present embodiment, the manipulation selection buttons 409 include a positioner manipulation button, a posture control button, and a main body manipulation button. The manipulation selection buttons 409 may be displayed together with information, such as a next manipulation message 415 prompting next manipulation. When the user 0 contacts the positioner manipulation button among the manipulation selection buttons 409, the display 41 receives the input of the selection of the positioner manipulation and transmits the input to the control portion 46.

The control portion 46 which has acquired the selection of the positioner manipulation displays mode selection buttons 401 to 405 (corresponding to a first manipulation tool in the claims) on the display 41. The mode selection buttons 401 to 405 may be displayed together with information, such as a guide of the next manipulation.

In the present embodiment, five modes that are a height movement mode, a horizontal movement mode, a horizontal rotation mode, a left-right tilting rotation mode, and a front-rear tilting rotation mode are set as an operating mode of the platform 5. The height movement mode is an operating system of the positioner 7 which lifts or lowers the platform 5. The horizontal movement mode is an operating system of the positioner 7 which moves the platform 5 within a horizontal plane. The horizontal rotation mode is an operating system of the positioner 7 which rotates the platform 5 about a vertical rotation axis. The left-right tilting rotation mode is an operating system of the positioner 7 which swings the platform 5 about a horizontal rotation axis perpendicular to the longitudinal direction of the main body 50. The front-rear tilting rotation mode is an operating system of the positioner 7 which swings the platform 5 about a horizontal rotation axis parallel to the longitudinal direction of the main body 50.

As shown in FIG. 6, when the user 0 contacts any one of the mode selection buttons 401 to 405, the display 41 receives the input of the selection of the operating mode and transmits the input to the control portion 46. The control portion 46 which has acquired the selection of the operating mode (Step S01) displays on the display 41 a manipulation screen image 400 corresponding to the selected operating mode and displayed at the time of the presetting (Step S02).

Figure 7:
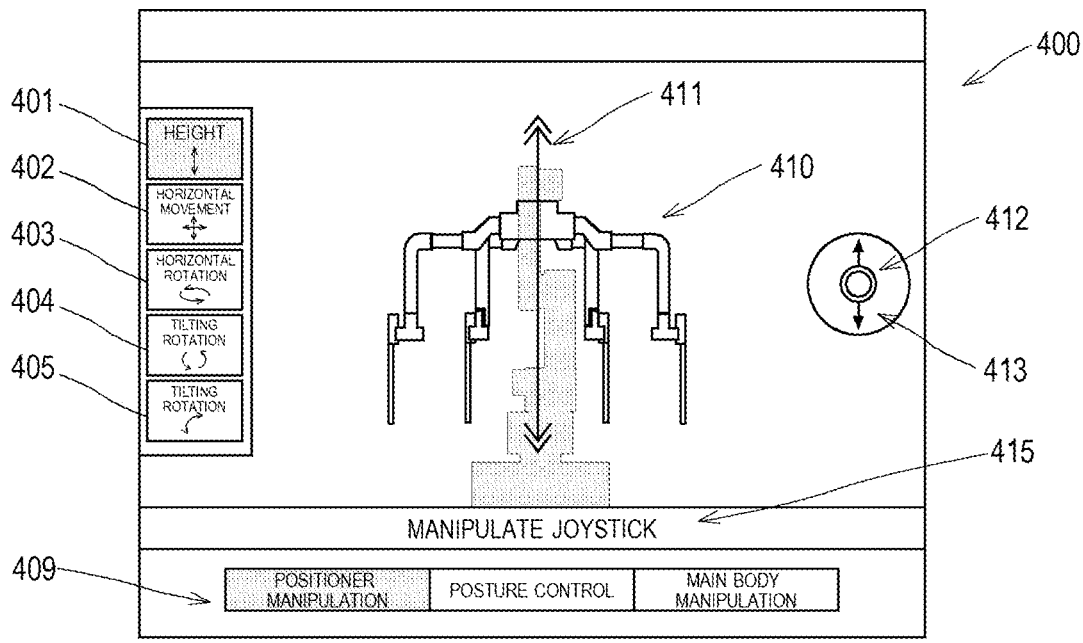
FIG. 7 is a diagram showing one example of a manipulation screen image in which a height movement mode is being selected.

FIG. 7 shows one example of the manipulation screen image 400 in which the height movement mode is being selected. The manipulation selection buttons 409 are displayed at a lower portion of the manipulation screen image 400 shown in FIG. 7. In this case, since the platform 5 is moved by manipulating the positioner 7, the positioner manipulation button is being selected among the manipulation selection buttons 409 that are the positioner manipulation button, the posture control button, and the main body manipulation button.

The mode selection buttons 401 to 405 related to the movement of the platform 5 are displayed at a left side portion of the manipulation screen image 400. In the present embodiment, the mode selection buttons 401 to 405 corresponding to the five operating modes are provided. It should be noted that the button of the operating mode which is being selected is displayed on the screen image in a different way (for example, a different color) from the button of the operating mode which is not being selected.

A front view of a model 410 of the surgical robot 1 when viewed from the user 0 who is manipulating the manipulation input device 48 is displayed at a middle of the manipulation screen image 400 in which the height movement mode is being selected, and a first mark 411 indicating the movement direction of the platform 5 is displayed so as to overlap the model 410. As the model 410, at least the platform 5 and the positioner 7 are only required to be displayed. As the positioner 7, a part to which the platform 5 is coupled may be shown.

The next manipulation message 415 which prompts the next manipulation (in this case, the manipulation of the joystick 45) is displayed under the model 410 in the manipulation screen image 400. In addition, a model 412 of the joystick 45 and a second mark 413 are displayed at a right side portion of the manipulation screen image 400. The second mark 413 indicates a manipulation direction of the joystick 45 corresponding to the operating mode which is being selected. In the present embodiment, the first mark 411 and the second mark 413 are arrows. However, these marks are not limited to the arrows. It is desirable that the first mark 411 and the second mark 413 be displayed by the same type of images or images related to each other such that the correspondence between the first mark 411 and the second mark 413 becomes clear.

Next, the user 0 presses the trigger switch 44 in order to activate the manipulation of the joystick 45. The robot controller 600 is in a stand-by state until the robot controller 600 detects the on state of the trigger switch 44 (NO in Step S03), and therefore, the robot controller 600 does not receive the input of the manipulation from the joystick 45. When the robot controller 600 detects the on state of the trigger switch 44 (YES in Step S03), the robot controller 600 is set to receive the input of the manipulation from the joystick 45. Then, while pressing the trigger switch 44, the user 0 moves the joystick 45 in a direction corresponding to the second mark 413. Only while the on state of the trigger switch 44 is being detected, the robot controller 600 receives the input of the manipulation from the joystick 45 (Step S04). In accordance with the acquired input of the manipulation, the control portion 46 may change the position and posture of the model 410 in the manipulation screen image 400. Based on the acquired input of the manipulation and the operating mode which is being selected, the robot controller 600 generates a command regarding the position and posture of the platform 5 or the operation of the positioner 7 (Step 505). The robot controller 600 operates the joints J71 to J77 of the positioner 7 in accordance with the command (Step S06) to move the platform 5.

Figure 8:
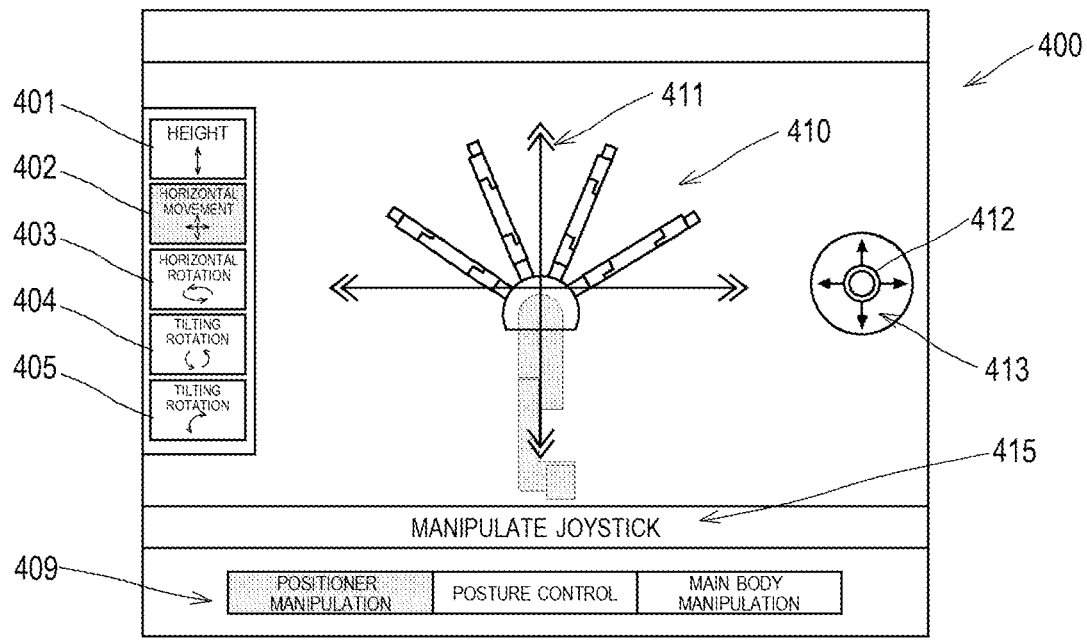
FIG. 8 is a diagram showing one example of the manipulation screen image in which a horizontal movement mode is being selected.

FIG. 8 is a diagram showing one example of the manipulation screen image 400 in which the horizontal movement mode is being selected. A plan view of the model 410 of the surgical robot 1 is displayed in the manipulation screen image 400 in which the horizontal movement mode is being selected. Moreover, the first mark 411 having a cross shape is displayed as the movement direction of the platform 5 so as to overlap the model 410, and the second mark 413 having a cross shape is displayed as the movement direction of the joystick 45 at a right side of the model 410. The mode selection buttons 401 to 405, the manipulation selection buttons 409, the model 412, and the next manipulation message 415 are common among the screen images of the respective operating modes.

Figure 9:
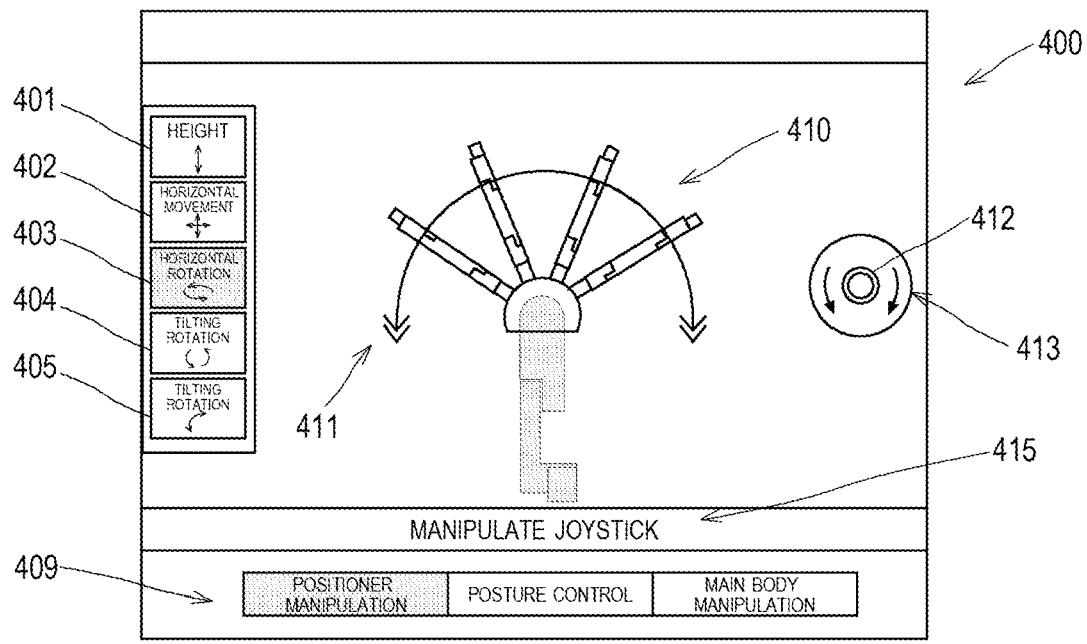
FIG. 9 is a diagram showing one example of the manipulation screen image in which a horizontal rotation mode is being selected.

FIG. 9 is a diagram showing one example of the manipulation screen image 400 in which the horizontal rotation mode is being selected. A plan view of the model 410 of the surgical robot 1 is displayed in the manipulation screen image 400 in which the horizontal rotation mode is being selected. Moreover, the first mark 411 having a semicircular-arc shape (or a partial circular-arc shape) is displayed as the movement direction of the platform 5 so as to overlap the model 410, and the second mark 413 having a semicircular-arc shape (or a partial circular-arc shape) is displayed as the movement direction of the joystick 45 at a right side of the model 410.

Figure 10:
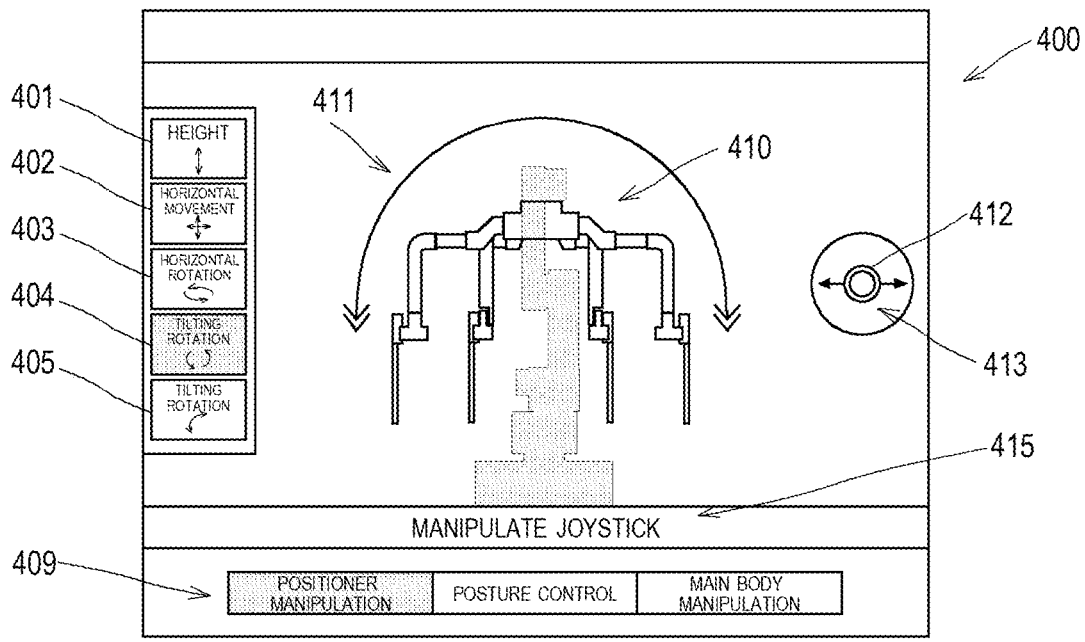
FIG. 10 is a diagram showing one example of the manipulation screen image in which a left-right tilting rotation mode is being selected.

FIG. 10 is a diagram showing one example of the manipulation screen image 400 in which the left-right tilting rotation mode is being selected. A front view of the model 410 of the surgical robot 1 when viewed from the user 0 who is manipulating the manipulation input device 48 is displayed at a middle of the manipulation screen image 400 in which the left-right tilting rotation mode is being selected. Moreover, the first mark 411 having a semicircular-arc shape (or a partial circular-arc shape) is displayed as the movement direction of the platform 5 so as to overlap the model 410, and the second mark 413 extending in a left-right direction in the screen image is displayed as the movement direction of the joystick 45 at a right side of the model 410.

Figure 11:
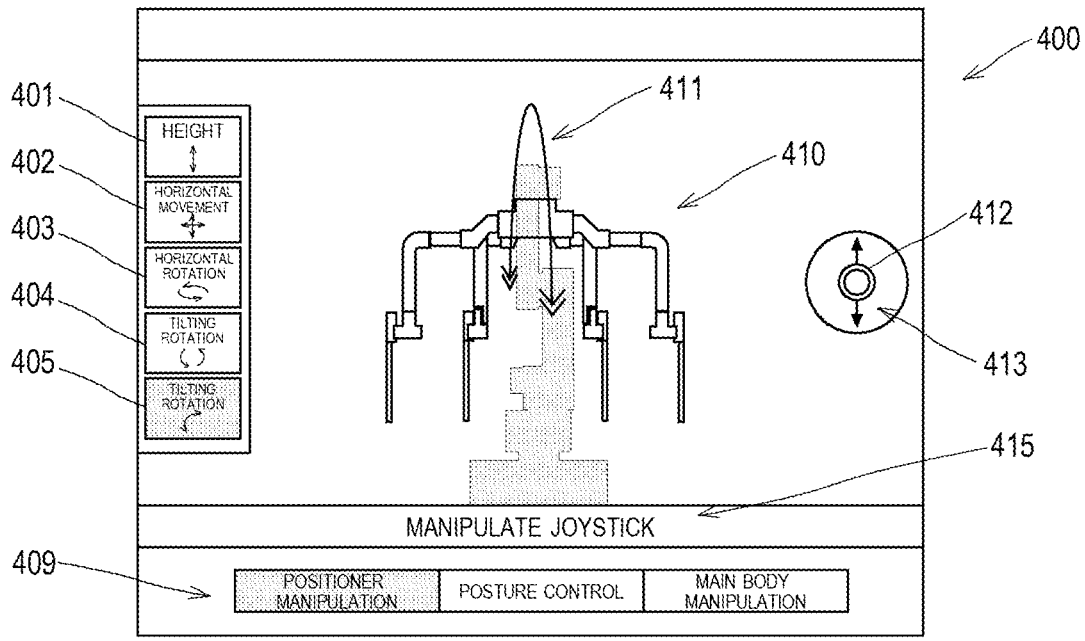
FIG. 11 is a diagram showing one example of the manipulation screen image in which a front-rear tilting rotation mode is being selected.

FIG. 11 is a diagram showing one example of the manipulation screen image 400 in which the front-rear tilting rotation mode is being selected. A front view of the model 410 of the surgical robot 1 when viewed from the user 0 who is manipulating the manipulation input device 48 is displayed at a middle of the manipulation screen image 400 in which the front-rear tilting rotation mode is being selected. Moreover, the first mark 411 having a semicircular-arc shape (or a partial circular-arc shape) is displayed as the movement direction of the platform 5 so as to overlap the model 410, and the second mark 413 extending in an upper-lower direction in the screen image is displayed as the movement direction of the joystick 45 at a right side of the model 410.

As described above, in the manipulation screen image 400 in which any one of the operating mode is being selected, the model 410 of the surgical robot 1 corresponding to the operating mode is displayed. Moreover, the first mark 411 is displayed as the movement direction of the platform 5 in the model 410, and the second mark 413 is displayed as the manipulation direction of the joystick 45 which moves the platform 5. The model 410 of the surgical robot 1 is displayed such that the first mark 411 indicating the movement direction of the platform 5 and the second mark 413 indicating the manipulation direction of the joystick 45 become practically the same in direction as each other in the manipulation screen image 400.

The movement direction of the platform 5 is displayed by the first mark 411 together with the model 410. Therefore, in the operating mode which is being currently selected, the user 0 can intuitively recognize a direction in which the platform 5 should be moved. Moreover, by the second mark 413 indicating the manipulation direction of the joystick 45, the user 0 can intuitively recognize a direction in which the joystick 45 should be manipulated. Then, the movement direction of the platform 5 and the manipulation direction of the joystick 45 are the same as each other or similar to each other in the manipulation screen image 400. Therefore, by visually confirming the manipulation screen image 400, the user 0 can intuitively manipulate the joystick 45 to input a command regarding the movement direction of the platform 5.

As described above, the surgical robot 1 according to the present embodiment includes: a plurality of manipulator arms 3 including respective distal end portions to which the surgical instruments 4 are attached; the platform 5 to which proximal end portions of the plurality of manipulator arms 3 are coupled; the positioner 7 including the plurality of links 91 to 96 and the joint driving devices D71 to D77, the plurality of links 91 to 96 being provided in series through the joints J71 to J77, the joint driving devices D71 to D77 being provided at the respective joints J71 to J77, the positioner 7 supporting the platform 5 and being configured to change the position and posture of the platform 5; the controller 600 configured to operate the positioner 7 such that the position and posture of the platform 5 correspond to a commanded position and posture; and the manipulation input device 48 (user interface) configured to receive the input of the manipulation regarding the positioner 7.

The manipulation input device 48 includes: the mode selection buttons 401 to 405 (first manipulation tools) each configured to receive the input of the manipulation which selects one of a plurality of operating modes for changing the position and posture of the platform 5; and the single joystick 45 (second manipulation tool) configured to receive the input of the manipulation information regarding the position and posture. The controller 600 generates a command regarding the position and posture of the platform 5 based on the manipulation information received by the joystick 45 and the selected operating mode and operates the positioner 7 based on the generated command.

A method of manipulating the positioner 7 according to the present embodiment is a method of manipulating the positioner 7 in the surgical robot 1 including: the plurality of manipulator arms 3 including respective distal end portions to which the surgical instruments 4 are attached; the platform 5 to which proximal end portions of the plurality of manipulator arms 3 are coupled; the positioner 7 including the plurality of links 91 to 96 and the joint driving devices D71 to D77, the plurality of links 91 to 96 being provided in series through the joints J71 to J77, the joint driving devices D71 to D77 being provided at the respective joints J71 to J77, the positioner 7 supporting the platform 5 and being configured to change the position and posture of the platform 5; and the controller 600 configured to operate the positioner 7 such that the position and posture of the platform 5 correspond to a commanded position and posture. The method includes: acquiring a selected one of a plurality of operating modes which are input from the mode selection buttons 401 to 405 (first manipulation tools) to change the position and posture of the platform 5; acquiring manipulation information regarding the position and posture of the platform 5, the manipulation information being input from the joystick 45 (second manipulation tool); generating a command regarding the position and posture of the platform 5 based on the acquired manipulation information and the selected operating mode; and operating the positioner 7 based on the generated command.

According to the surgical robot 1 and the method of manipulating the positioner 7, the manipulation information regarding the position and posture is input by the single joystick 45 regardless of the operating mode. To be specific, a manipulation tool for the height movement of the platform 5 and a manipulation tool for the horizontal movement of the platform 5 are not being used. Therefore, the number of manipulation tools provided at the manipulation input device 48 can be reduced. Moreover, wrong manipulation, such as confusion of the manipulation tools, can be prevented, and the manipulation can be simplified. As above, according to the present invention, the manipulation of the user 0 can be made easier as a whole than when the conventional user interface is used.

Moreover, in the surgical robot 1 according to the present embodiment, the manipulation input device 48 (user interface) further includes the trigger switch 44 (third manipulation tool), and the controller 600 acquires the manipulation information, input through the joystick 45 (second manipulation tool), only while the trigger switch 44 is being manipulated (i.e., only while the trigger switch 44 is in the on state).

Similarly, in the method of manipulating the positioner 7 according to the present embodiment, the input manipulation information is acquired only while the trigger switch 44 (third manipulation tool) is being manipulated (i.e., only while the trigger switch 44 is in the on state).

As above, since the input of the manipulation of the joystick 45 is activated only while the trigger switch 44 is being manipulated, the input of the wrong manipulation can be prevented, and the safety can be improved.

Moreover, in the surgical robot 1 according to the present embodiment, the user interface includes the display 41. The manipulation input device 48 (user interface) displays a plurality of operating modes on the display 41 such that the plurality of operating modes are selectable. Or, the manipulation input device 48 (user interface) makes the display 41 present a plurality of operating modes such that a selected one of the operating modes is discriminated from the other operating modes.

The display 41 may be a touch panel display, and the first manipulation tools may be the mode selection buttons 401 to 405 corresponding to the plurality of operating modes displayed on the touch panel display.

Similarly, the method of manipulating the positioner 7 according to the present embodiment further includes displaying the manipulation screen image 400 corresponding to the selected operating mode on the display 41.

According to the surgical robot 1 and the method of manipulating the positioner 7, the selection of the operating mode of the platform 5 is input by manipulating the mode selection buttons 401 to 405, and the manipulation screen image 400 corresponding to the selected operating mode is displayed on the display 41. With this, the user 0 can immediately recognize the operating mode (i.e., the movement direction of the platform 5 by the manipulation of the joystick 45) of the platform 5, and the wrong manipulation, such as the input of the manipulation in an unintended direction, can be suppressed.

Moreover, according to the surgical robot 1 and the method of manipulating the positioner 7, the manipulation screen image 400 displayed on the display 41 includes: the model 410 including the positioner 7 and at least one of the platform 5 and the plurality of manipulator arms; the first mark 411 indicating the movement direction of the platform 5 in the model 410; and the second mark 413 indicating the manipulation direction of the joystick 45 (second manipulation tool). It is desirable that a direction indicated by the first mark 411 and a direction indicated by the second mark 413 be parallel to each other in the manipulation screen image 400.

With this, the user 0 can intuitively recognize the movement direction of the platform 5 and the manipulation direction of the joystick 45 by looking at the manipulation screen image 400. Then, since the first mark 411 and the second mark 413 correspond to each other in the manipulation screen image 400, mistakes of the manipulation of the joystick 45 can be prevented.

Moreover, the surgical robot 1 according to the present embodiment further includes the cart 70 supporting the positioner 7, and the manipulation input device 48 (user interface) is provided at the cart 70.

The positioner 7 moves the platform 5 relative to the cart 70. As described above, the manipulation input device 48 is provided at the cart 70. Therefore, when moving the platform 5 by manipulating the positioner 7 by using the manipulation input device 48, the user 0 who manipulates the manipulation input device 48 can intuitively manipulate the manipulation tools on the manipulation input device 48.

The foregoing has described a preferred embodiment of the present invention. Specific structures and/or functional details of the above embodiment may be modified within the scope of the present invention. The configuration of the surgical robot 1 may be modified as below.

For example, in the above embodiment, the first manipulation tools for selecting the operating modes are the mode selection buttons 401 to 405 displayed on the touch panel display 41. However, the first manipulation tools are not limited to these. Each of the mode selection buttons 401 to 405 may be constituted by a physical manipulation tool (such as a button switch, a pin switch, or a lever). Moreover, the mode selection buttons 401 to 405 may be displayed on a display other than the touch panel display, and the operating mode may be selected by selecting the button with the first manipulation tool, such as a mouse or a touchpad.

Moreover, for example, in the above embodiment, instead of the joystick 45, a manipulation tool (such as a track ball or a cross key) by which the manipulation information regarding the manipulation amount and movement direction of the position and posture can be input may be adopted.

What is claimed is:

1. A surgical robot comprising:
   a plurality of manipulator arms including respective distal end portions to which surgical instruments are attached;
   a platform to which proximal end portions of the plurality of manipulator arms are coupled;
   a positioner including a plurality of links and joint driving devices, the plurality of links being provided in series through joints, the joint driving devices being provided at the respective joints, the positioner supporting the platform and being configured to change a position and posture of the platform;
   a controller configured to operate the positioner such that the position and posture of the platform correspond to a commanded position and posture; and
   a user interface configured to receive an input of manipulation regarding the positioner, wherein:
   the user interface includes
      first manipulation tools each configured to receive an input of manipulation which selects one of a plurality of operating modes for changing the position and posture of the platform and
      a single second manipulation tool configured to receive an input of manipulation information regarding the position and posture; and
   the controller generates a command regarding the position and posture of the platform based on the manipulation information received by the second manipulation tool and the selected operating mode and operates the positioner based on the generated command.

2. The surgical robot according to claim 1, wherein:
   the user interface further includes a third manipulation tool; and
   the controller acquires the manipulation information only while the third manipulation tool is being manipulated.

3. The surgical robot according to claim 1, wherein:
   the user interface includes a display; and
   the display displays the plurality of operating modes such that the plurality of operating modes are selectable.

4. The surgical robot according to claim 2, wherein:
   the user interface includes a display; and
   the display displays the plurality of operating modes such that the plurality of operating modes are selectable.

5. The surgical robot according to claim 1, wherein:
the user interface includes a display; and
the display presents the plurality of operating modes such that a selected one of the plurality of operating modes is discriminated from the other operating modes.

6. The surgical robot according to claim 2, wherein:
the user interface includes a display; and
the display presents the plurality of operating modes such that a selected one of the plurality of operating modes is discriminated from the other operating modes.

7. The surgical robot according to claim 3, wherein:
the display is a touch panel display; and
the first manipulation tools are mode selection buttons corresponding to the plurality of operating modes displayed on the touch panel display.

8. The surgical robot according to claim 5, wherein:
the display is a touch panel display; and
the first manipulation tools are mode selection buttons corresponding to the plurality of operating modes displayed on the touch panel display.

9. The surgical robot according to claim 3, wherein:
the display displays a manipulation screen image corresponding to the selected operating mode; and
the manipulation screen image includes
a model including the positioner and at least one of the platform and the plurality of manipulator arms,
a first mark indicating a movement direction of the platform in the model, and
a second mark indicating a manipulation direction of the second manipulation tool.

10. The surgical robot according to claim 4, wherein:
the display displays a manipulation screen image corresponding to the selected operating mode; and
the manipulation screen image includes
a model including the positioner and at least one of the platform and the plurality of manipulator arms,
a first mark indicating a movement direction of the platform in the model, and
a second mark indicating a manipulation direction of the second manipulation tool.

11. The surgical robot according to claim 5, wherein:
the display displays a manipulation screen image corresponding to the selected operating mode; and
the manipulation screen image includes
a model including the positioner and at least one of the platform and the plurality of manipulator arms;
a first mark indicating a movement direction of the platform in the model; and
a second mark indicating a manipulation direction of the second manipulation tool.

12. The surgical robot according to claim 6, wherein:
the display displays a manipulation screen image corresponding to the selected operating mode; and
the manipulation screen image includes
a model including the positioner and at least one of the platform and the plurality of manipulator arms;
a first mark indicating a movement direction of the platform in the model; and
a second mark indicating a manipulation direction of the second manipulation tool.

13. The surgical robot according to claim 7, wherein:
the display displays a manipulation screen image corresponding to the selected operating mode; and
the manipulation screen image includes
a model including the positioner and at least one of the platform and the plurality of manipulator arms;
a first mark indicating a movement direction of the platform in the model; and
a second mark indicating a manipulation direction of the second manipulation tool.

14. The surgical robot according to claim 1, further comprising a cart supporting the positioner, wherein
the user interface is provided at the cart.

15. A method of manipulating a positioner in a surgical robot,
the surgical robot including:
a plurality of manipulator arms including respective distal end portions to which surgical instruments are attached;
a platform to which proximal end portions of the plurality of manipulator arms are coupled;
a positioner including a plurality of links and joint driving devices, the plurality of links being provided in series through joints, the joint driving devices being provided at the respective joints, the positioner supporting the platform and being configured to change a position and posture of the platform; and
a controller configured to operate the positioner such that the position and posture of the platform correspond to a commanded position and posture,
the method comprising:
acquiring a selected one of a plurality of operating modes which are input from first manipulation tools to change the position and posture of the platform;
acquiring manipulation information regarding the position and posture of the platform, the manipulation information being input from a second manipulation tool;
generating a command regarding the position and posture of the platform based on the acquired manipulation information and the selected operating mode; and
operating the positioner based on the generated command.

16. The method according to claim 15, wherein the manipulation information is acquired only while a third manipulation tool is being manipulated.

17. The method according to claim 15, further comprising displaying a manipulation screen image corresponding to the selected operating mode on a display.

18. The method according to claim 16, further comprising displaying a manipulation screen image corresponding to the selected operating mode on a display.

19. The method according to claim 17, wherein
the manipulation screen image includes:
a model including the positioner and at least one of the platform and the plurality of manipulator arms;
a first mark indicating a movement direction of the platform in the model; and
a second mark indicating a manipulation direction of the second manipulation tool.

20. The method according to claim 18, wherein
the manipulation screen image includes:
a model including the positioner and at least one of the platform and the plurality of manipulator arms;
a first mark indicating a movement direction of the platform in the model; and
a second mark indicating a manipulation direction of the second manipulation tool.

* * * * *